United States Patent

Fournier et al.

[11] 3,950,842
[45] Apr. 20, 1976

[54] METHOD FOR MAKING A SOLID ELECTROLYTE CAPACITOR

[75] Inventors: Lawrence E. Fournier, Penacook; Martin J. Daigneault, Plymouth; Frederick G. Tarbin, West Franklin, all of N.H.

[73] Assignee: Sprague Electric Company, North Adams, Mass.

[22] Filed: Apr. 21, 1975

[21] Appl. No.: 569,713

[52] U.S. Cl. .................................. 29/570; 317/230
[51] Int. Cl.² ........................................ B01J 17/00
[58] Field of Search ....................... 29/570; 317/230

[56] References Cited
UNITED STATES PATENTS

| | | | |
|---|---|---|---|
| 3,174,209 | 3/1965 | Millard | 29/570 |
| 3,241,008 | 3/1966 | Komisarek | 29/570 |
| 3,481,029 | 12/1969 | Wittke | 29/570 |
| 3,538,395 | 11/1970 | Riley | 29/570 |
| 3,581,159 | 5/1971 | Piper | 29/570 |

*Primary Examiner*—W. Tupman
*Attorney, Agent, or Firm*—Connolly and Hutz

[57] ABSTRACT

A method for making a solid electrolyte capacitor comprises forming a dielectric film on a porous valve-metal pellet, impregnating the pellet with a manganese salt and pyrolyzing, applying to the pellet a thixotropic coating of manganese salt, immersing the wet coated pellet into a fluidized bed of coarse manganese dioxide particles, pyrolyzing the coating and depositing on the rough surfaces of the coating a tightly bonded counterelectrode.

11 Claims, 2 Drawing Figures

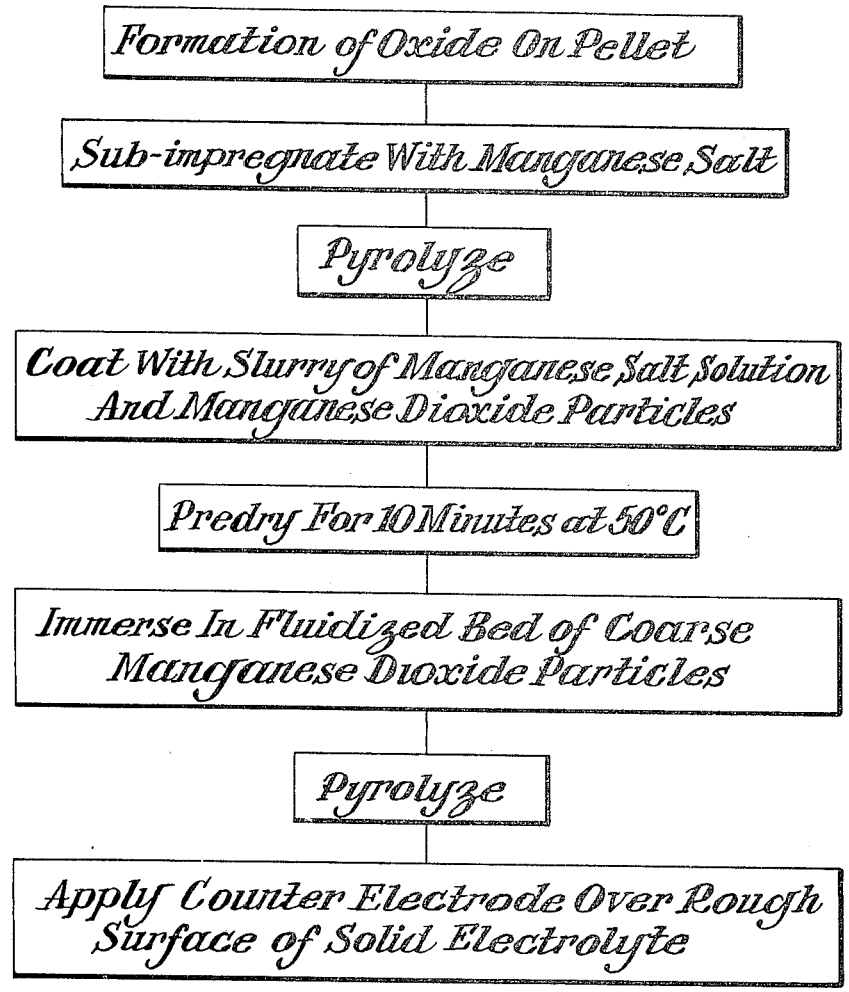
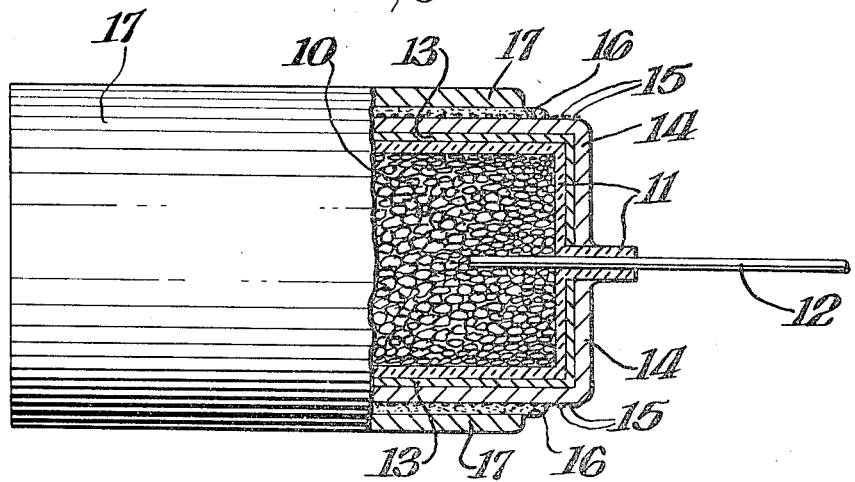

METHOD FOR MAKING A SOLID ELECTROLYTE CAPACITOR

BACKGROUND OF THE INVENTION

This invention relates to methods for making solid electrolyte capacitors, and more particularly to the preparation of solid electrolyte capacitor anodes having a uniform profile.

Solid electrolyte capacitors typically comprise a sintered anode pellet formed with a dielectric oxide on the surfaces of the sintered particles of the pellet and have a dry solid electrolyte positioned in and around the pores of the pellet. These anodes are incorporated in a suitable casing after the application of a conductive counterelectrode over the solid electrolyte.

The size and weight of the uniform cased capacitor assembly is often considerably larger than that of the bare pellet because the solid electrolyte covering the pellet is typically very non-uniform. The solid electrolyte is typically applied by submersion in a manganese salt followed by heating to pyrolyze and convert the salt to a solid manganese dioxide electrolyte. In order to build a sufficiently thick electrolyte coating, these steps of immersing and pyrolyzing are repeated many times, e.g. 10–15 times. The resulting surface is rough and uneven, tending to grow especially large in the regions of the corners of the pellet.

One solution to this problem has been to abrade or cut and form a uniform surface to the electrolyte coating. Besides increasing the cost, the mechanical abrading or cutting step tends to damage the pellet, reduce the yields, and shorten the useful life of the capacitor.

In U.S. Pat. Nos. 3,241,008 issued Mar. 15, 1966 and 3,481,029 issued Dec. 2, 1969 there are described methods for applying thick coatings of manganese dioxide to a pellet. The pellet is immersed in a gel or a sol containing manganous nitrate and silica powder. The thick coating thus applied is subsequently pyrolyzed. This substantially reduces the number of immersion and heating steps. The reduction in the number of heating steps tends to improve the yield and quality of the capacitors, and the surfaces of the electrolyte coating is smooth, typically appearing under the microscope as a mat of shiny nodules.

It is also known to substitute manganese dioxide powder for the silica in the slurry mixture with manganous nitrate, to reduce the number of heating steps and to produce a similarly uniform and smooth electrolyte coating.

These smooth solid electrolyte coatings, however, have the disadvantage that subsequent conductive counterelectrode coatings do not adhere well and now for a different reason, capacitor yields and life expectancy are reduced. It has been proposed that further immersions into pure manganous nitrate followed by pyrolyzing will provide a rougher surface to cure this problem, but the added heating step or steps are undesirable and the counterelectrode bonding is not rendered entirely satisfactory by this expedient.

It is therefore an object of this invention to provide a uniform solid electrolyte coating for a capacitor pellet to which secure bonding of a counterelectrode is readily made.

It is a further object of this invention to provide a method for forming a tough uniform solid electrolyte coating having a rough surface which method employs a minimum of heating steps.

SUMMARY OF THE INVENTION

A solid electrolytic capacitor is made by forming on a porous valve-metal pellet a dielectric oxide film, impregnating the porous pellet with a solution of a manganese salt and pyrolyzing to form an overcoat of $MnO_2$, applying a thixotropic coating of a mixture of manganese salt solution and finely divided solid particles serving as a thickening agent such as $MnO_2$ and/or a silica powder, and immersing the wet coated body in a fluidized bed of coarse $MnO_2$ particles having diameters greater than 20 microns. The pellet is then heated again to pyrolyze the top $MnO_2$ coat and to bind to its outer surface protruding particles of $MnO_2$ that give it a surface roughness. Subsequently, conductive coatings of graphite and metal may be deposited on the rough $MnO_2$ surface to form a tightly bonded counterelectrode.

BRIEF DESCRIPTION OF THE DRAWING

FIG. 1 shows a flow diagram of the preferred method of this invention.

FIG. 2 shows a partial section of the capacitor made according to this invention.

DESCRIPTION OF THE PREFERRED EMBODIMENTS

Referring to FIGS. 1 and 2, the electrode is first fabricated from a valve-metal and preferably tantalum by known methods, viz., compressing and sintering tantalum particles to form a rigid porous sintered pellet 10. This porous pellet 10 is given an oxide film by being made the anode in an electrolytic bath, forming an anodic dielectric film 11 of $Ta_2O_5$ (tantalum oxide) on the pellet. An anode lead 12, preferably of tantalum is attached to the sintered pellet either by embedding it therein during pressing or by subsequent welding. The anodized tantalum pellet is then dipped in an aqueous solution of $Mn(NO_3)_2$ and subsequently fired at a temperature and for a time sufficient to form an $MnO_2$ coating 13.

This requires a firing temperature of about 250°–420°C so as to thermally decompose the $Mn(NO_3)_2$ to the oxide. The impregnation with $Mn(NO_3)_2$ and subsequent thermal decomposition to the oxide may be repeated one or more times to insure a thorough impregnation so as to fill the pores of the pellet 10, preferably with an intermediate step of re-anodizing in a weak electrolyte bath to heal the oxide film, with 1 to 3 times being preferred. To this point, the process is conventional and does not require a more detailed explanation than that set forth above.

The anodized electrode with its $MnO_2$ coating 13 is now dipped into a thixotropic mixture of manganous nitrate and finely divided particles of manganese dioxide forming coating 14.

It is preferred that the thixotropic mixture contain colloidal manganese dioxide powders having particles whose diameters are no greater than 1.0 micron. This insures that the particles remain uniformly distributed in the slurry and obviates the necessity for periodically stirring or of maintaining the mixture at an elevated temperature to prevent settling. To obtain small particles, it is conventional to employ one of several standard ball or roll milling methods. However, these methods will not provide the colloidal $MnO_2$ powers desired. It is therefore necessary to prepare the colloidal $Mno_2$ by some other method such as jet milling, using for example mills as made by the Jet Pulverizing Company, Palmyra, New Jersey.

In one specific embodiment the mixture was prepared by mixing 66 parts by weight of manganous nitrate with 33 parts of manganese dioxide powder having solid particles all less than 1.0 micron in diameter, and 1 part silica powder having an average particle size of about 0.02 micron. The colloidal silica serves the purpose of making the thixotropic mixture more viscous and its addition is not essential, since the rheology of the mixture may be adjusted as needed by controlling the amount and size of $MnO_2$ particles added.

Viscosity readings on the above noted slurry mixture were taken at 25°C on a standard Brookfield viscometer Model LVF using a No. 4 spindle, and are given in Table I as a function of shear rate in revolutions per minute (r.p.m.).

Table 1

| Shear Rate (r.p.m.) | Viscosity (centipoise) |
|---|---|
| 6 | 8000 |
| 12 | 4500 |
| 30 | 2000 |
| 60 | 1200 |

After the dipping step the pellet is placed in a warm oven, namely at about 50°C for 10 minutes, and partially dried. The pellet is then immersed into a fluidized bed of manganese dioxide particles having an average particle size of from 30 to 100 microns and preferably from 40 to 50 microns. The particles 15 adhere to the still tacky surface of the pellet coating 14. The warm pellet is again placed into an oven and the temperature gradually increased from about 50°C to 120°C over a fifteen minute period. The pellet is subsequently subjected to steam at about 300°C to pyrolyze and convert the manganous salt to manganese dioxide, the coarse $MnO_2$ particles 15 remaining on the outer surface and becoming securely bonded to the uniform $MnO_2$ coating 14. Although steam pyrolysis at about 300°C is preferred, steam pyrolysis at temperatures as high as 350°C is suitable and as low as 250°C is possible though requiring a longer time. Also pyrolysis without steam at about 350°C to 420°C is practical.

The electrode is then replaced in an electrolytic bath such as ammonium chloride and reformed for a short time as in the healing step referred to above. This is a safety measure to heal any cracks in the oxide film that are the result of thermal damage during the pyrolysis steps. The coating is still such that the reformation electrolyte can contact the base tantalum metal at any break in the oxide.

Subsequently, the electrolyte is coated with a thin film of graphite 16, as by immersion in an aqueous suspension of graphite, followed by drying. A metal electrode coating 17 is then applied over the graphite by known means. A typical means for accomplishing this metallizing is by dipping the graphite coated body in a paste of silver particles and organic resin binder followed by heat curing the resin to form a condutive metal containing coating 17. Alternatively a coating 17 of tin-lead solder may be applied by flame spraying or by other means. The unit may then be sealed in a metal can, or alternatively may be encapsulated in plastic or an epoxy molding compound (not shown).

It should be understood that the thixotropic layer 14 may contain any suitable rheology-affecting powder materials as have been heretofore suggested, the above described preferred embodiment merely being chosen as the best mode and illustrative for the practice of this invention.

What is claimed is:

1. A method for making a solid electrolytic capacitor comprising:
   a. forming on the surfaces of a porous valve-metal pellet a dielectric oxide film;
   b. impregnating the porous pellet with a solution of a manganese salt;
   c. heating the impregnated pellet to pyrolyze and convert the manganese salt to a manganese dioxide layer that lies adjacent to the dielectric oxide film;
   d. applying to the pellet a thixotropic coating of a mixture comprised of a manganese salt solution and finely divided solid particles;
   e. immersing the coated pellet while wet into a fluidized bed containing coarse manganese dioxide particles having an average particle size greater than 30 microns;
   f. heating the coated pellet to pyrolyze and convert the manganese salt coating to an essentially uniform solid manganese dioxide coating so that the outer surface of the coating is made rough by the coarse manganese dioxide particles being bonded to and projecting from the coating; and
   g. depositing a conductive counterelectrode in tightly bonded relationship to the rough outer surface of the coated pellet.

2. The method of claim 1 wherein the conductive counterelectrode is comprised of graphite and silver, the depositing being accomplished by immersing the coated pellet in an aqueous suspension of graphite, drying, applying over said graphite a paste of silver particles and an organic resin, and heat curing the paste.

3. The method of claim 1 wherein the conductive counterelectrode is comprised of graphite and a tin-lead alloy.

4. The method of claim 1 wherein the impregnating the pellet and the heating the impregnated pellet are repeated from one to three times.

5. The method of claim 1 wherein the heating of the coated pellet is accomplished by increasing the temperature to 120°C during about a 15 minute interval, and subsequently subjecting the pellet to steam at a temperature of from 250°C to 350°C to complete the conversion to manganese dioxide.

6. The method of claim 1 additionally comprising, after applying the thixotropic coating, warming to partially dry and solidify the coating and stopping the heating before the coating is completely dry so that upon subsequently immersing the wet coated pellet in the fluidized bed, the manganese dioxide particles will stick to the wetted coating.

7. The method of claim 6 wherein the warming is accomplished by exposing the coated pellet to a temperature of about 50°C for about 10 minutes.

8. The method of claim 1 additionally comprising, after applying the thixotropic coating, heating to pyrolyze and convert the coating to manganese dioxide; wetting the surface of the coating with a manganese salt solution so that upon subsequently immersing the wet coated pellet in the fluidized bed, the manganese dioxide particles will stick to the wetted coating; and pyrolyzing the wetted coating.

9. The method of claim 1 wherein the manganese particles in the coating mixture have an average size that is less than 1.0 micron, for the purpose of providing a thick mixture in which the particles remain suspended and do not settle out, providing a uniform coating over the pellet.

10. The method of claim 1 wherein the coarse particles of the fluidized bed have an average size from 30 to 100 microns.

11. The method of claim 1 wherein the valve-metal is tantalum.

* * * * *